US012607863B2

(12) United States Patent (10) Patent No.: US 12,607,863 B2
Gallaher et al. (45) Date of Patent: Apr. 21, 2026

(54) SECUREMENT FOR AN ELECTRONIC DEVICE

(71) Applicant: Apple Inc., Cupertino, CA (US)

(72) Inventors: Andrew Gallaher, Sunnyvale, CA (US); Aiden D. Mossop, Sunnyvale, CA (US); Samuel G. Smith, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/597,864

(22) Filed: Mar. 6, 2024

(65) Prior Publication Data

US 2024/0210710 A1     Jun. 27, 2024

Related U.S. Application Data

(63) Continuation of application No. PCT/US2022/076229, filed on Sep. 9, 2022.

(60) Provisional application No. 63/261,413, filed on Sep. 20, 2021.

(51) Int. Cl.
    *G02B 27/01*          (2006.01)
(52) U.S. Cl.
    CPC ................................ *G02B 27/0176* (2013.01)
(58) Field of Classification Search
    CPC .................................................. G02B 27/0176
    See application file for complete search history.

(56) References Cited

U.S. PATENT DOCUMENTS

| | | | | |
|---|---|---|---|---|
| 2019/0243414 A1* | 8/2019 | Bae | .................... | G02B 27/0176 |
| 2019/0331928 A1* | 10/2019 | Lin | ........................ | G02C 11/08 |
| 2020/0371365 A1* | 11/2020 | Kamakura | ......... | G02B 27/0172 |
| 2021/0181516 A1* | 6/2021 | Skelton | .............. | G02B 27/0176 |
| 2021/0333506 A1* | 10/2021 | Maric | ................ | G02B 27/0172 |
| 2024/0103282 A1* | 3/2024 | Law | ........................ | G02C 5/126 |

FOREIGN PATENT DOCUMENTS

| | | |
|---|---|---|
| CN | 108152961 A | 6/2018 |
| WO | 2018068426 A1 | 4/2018 |

OTHER PUBLICATIONS

PCT International Search Report for International Application No. PCT/US2022/076229, mailed Dec. 9, 2022 (12 pp.).

* cited by examiner

*Primary Examiner* — Sahlu Okebato
(74) *Attorney, Agent, or Firm* — Dorsey & Whitney LLP

(57)          ABSTRACT

An electronic device can include a band that having a bifurcated rear portion. The bifurcated rear portion can include an upper elongate structure and a lower elongate structure that extend between bifurcation points of the band. In one example, each of the upper and lower elongate structures includes an outer tube, one or more inner tubes at least partially disposed within the outer tubes, and a biasing member, such as an elastic cord, disposed within both the upper and lower elongate portions. The inner tubes can be anchored to another portion of the electronic device such that the outer tubes, which slidably engage respective inner tubes, can be moved or pulled backward from the inner tubes and the display portion to adjust the size of the band. The elastic biasing member disposed within the upper and lower elongate members, including the outer tubes and the inner tubes, is configured to resist the backward movement and provide a tension force against the user's head when the user dons the electronic device.

18 Claims, 10 Drawing Sheets

SECUREMENT FOR AN ELECTRONIC DEVICE

CROSS-REFERENCE TO RELATED APPLICATION(S)

This application is a continuation of International Application No. PCT/US2022/076229, filed 9 Sep. 2022, and entitled "SECUREMENT FOR AN ELECTRONIC DEVICE," which claims priority to U.S. Provisional Patent Application No. 63/261,413, filed 20 Sept. 2021, and entitled "SECUREMENT FOR AN ELECTRONIC DEVICE," the entire disclosures of which are hereby incorporated by reference.

FIELD

The present disclosure relates generally to components of wearable electronic devices. More particularly, the present disclosure relates to securement bands of wearable electronic devices.

BACKGROUND

Recent advances in portable computing have led to virtual and alternate reality (VR/AR) devices such as head-mountable displays (HMDs). In general, HMDs include a display portion secured to the user's head via a securement mechanisms such as a strap or band. However, the display portion is generally heavy relative to the band and other components of the HMD and typical bands can be insufficient to comfortably apply the required force around the user's head to stabilize the display portion on the user's face, especially while moving and jostling the device during use. In addition, current bands can be awkward to don, doff, and adjust as needed for variations in user head size and anatomy.

Accordingly, there is a need in the art for electronic device bands that easily, effectively, and comfortably secure devices such as HMDs to the head of a user.

SUMMARY

In one example of the present disclosure, a head-mountable display can include a display unit and a band connected to the display unit. The band can include a tubular structure that includes an outer tube and an inner tube disposed within the outer tube. The electronic device band can also include an elastic cord disposed within the inner tube.

In one example of the head-mountable display, the tubular structure is a first tubular structure, the outer tube is a first outer tube, and the inner tube is a first inner tube. According to this example, the electronic device band further includes a second tubular structure. The second tubular structure can include a second outer tube and a second inner tube disposed within the outer tube. In one example of the head-mountable display, the elastic band is also disposed within the second inner tube. In one example of the head-mountable display, the electronic device band can also include a bifurcation point from where the first tubular structure extends separately from the second tubular structure. In one example of the head-mountable display, first tubular structure and the second tubular structure are non-parallel. In one example of the head-mountable display, a distance between the first tubular structure and the second tubular structure is at least about 70 mm at a maximum separation point. In one example of the head-mountable display, the first outer tube and the first inner tube are slidably engaged. In one example of the head-mountable display, the elastic cord resists a first movement of the first inner tube relative to the first outer tube along a longitudinal axis of the first tubular structure. In one example of the head-mountable display, the elastic cord resists a second movement of the second inner tube relative to the second outer tube along a longitudinal axis of the second tubular structure.

In one example of the present disclosure, a band for a wearable electronic device can include a bifurcated portion. The bifurcated portion can include an upper structure having a first outer elongate member and a first inner elongate member disposed within the first outer elongate member and a lower structure having a second outer elongate member and a second inner elongate member disposed within the second outer elongate member.

In one example, the band can also include a biasing member opposing an axial movement of the first outer elongate member relative to the first inner elongate member. In one example, the first inner elongate member includes a hollow tubular structure, the second inner elongate member includes a hollow tubular structure, and the biasing member is disposed within the first inner elongate member and the second inner elongate member. In one example, the biasing member can include an elastic cord. In one example, at least a portion of the biasing member is disposed outside the first outer elongate member. In one example, the biasing member includes an elastic sheath within which the first outer elongate member is disposed.

In one example of the present disclosure, a band includes a first bifurcation point, a second bifurcation point, a tubular structure extending from the first bifurcation point to the second bifurcation point, and an elastic member disposed within the first tubular structure.

In one example, the band can include an elongate structure extending from the first bifurcation point to the second bifurcation point with the elongate structure disposed non-parallel to the tubular structure. In such an example, the elastic member can be disposed within the elongate structure. In one example, the tubular structure includes an outer tube and an inner tube disposed within the outer tube. In such an example, the elastic member can be disposed within the inner tube. In one example, a material of the inner tube is harder than a material of the outer tube. In one example, the band can include a tensioner coupled to the elastic member. In one example, the band can include an external electronic component coupled to the tubular structure.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figures 1, 2A, 2B:
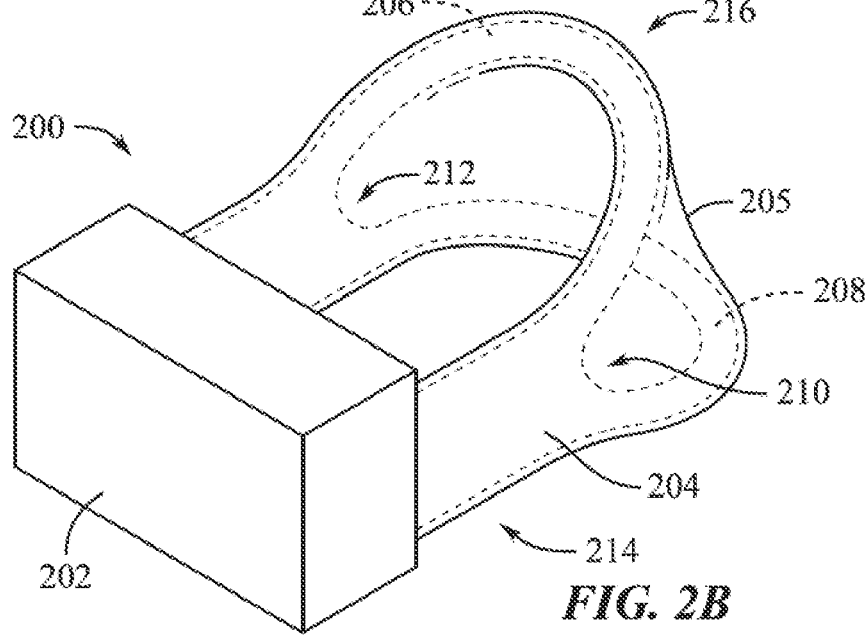
FIG. 1 shows an example of an electronic device worn by a user.
FIG. 2A shows a front perspective view of an example of an electronic device.
FIG. 2B shows a front perspective view of an example of an electronic device.

Reference will now be made in detail to representative embodiments illustrated in the accompanying drawings. The following descriptions are not intended to limit the embodiments to one preferred embodiment. Rather, it is intended to cover alternatives, modifications, and equivalents as can be included within the spirit and scope of the described embodiments as defined by the appended claims.

The following disclosure relates generally to components of wearable electronic devices. More particularly, the present disclosure relates to securement bands of wearable electronic devices. In particular, electronic devices and components thereof described herein provide secure and comfortable donning, doffing, and wearing of wearable electronic devices, such as head-mountable displays (HMDs).

For example, the present disclosure includes an electronic device having a band that includes a bifurcated rear portion. The bifurcated rear portion can include an upper elongate structure and a lower elongate structure that extend between bifurcation points of the band. In one example, each of the upper and lower elongate structures includes an outer tube, one or more inner tubes at least partially disposed within the outer tubes, and an elastic biasing member, such as an elastic cord, disposed within both the upper and lower elongate portions. The inner tubes can be anchored to a display portion of the electronic device such that the outer tubes, which slidably engage respective inner tubes, can be moved or pulled backward from the inner tubes and the display portion to adjust the size of the band. The elastic biasing member disposed within the upper and lower elongate members, including the outer tubes and the inner tubes, is configured to resist the backward movement and provide a tension force against the user's head when the user dons the electronic device.

Typical bands for wearable electronic devices such as HMDs are prone to wear and tear, slipping down the head during use, insufficient securement of the display portion of the HMD on the user's face, and uneven or inconsistent tension forces around the user's head. In addition, typical bands lack sufficient structure for securing external components, such as electronic components including speakers, batteries, and so forth, to the band. The bands of electronic devices described herein solve these and other problems found in the art.

For example, bands of the present disclosure can include a bifurcated rear portion that situates upper and lower elongate structures above and below the occipital protuberance of the user's head. This protuberance can be problematic for typical bands in the art as it tends to urge the band off the protuberance and out of optimal position for supporting the device on the head. Instead, bands of the present disclosure secure the device with a portion of the band split above and below the occipital protuberance such that the protuberance does not cause any slipping of the band. Rather, the bifurcated geometry of the bands disclosed herein take advantage of the occipital protuberance of the user's head by engaging opposing slopes on either side of the protuberance for a more secure fit.

In addition, the bifurcated geometry of bands described herein provide both upward and downward force vectors on the display portion of an HMD, for example, as the band presses the display portion against the face of a user. Upward force vectors from the bifurcated band press the display portion up against the brow and forehead of the user while downward force vectors press the display portion down against the cheeks and nose of the user, thus ensuring a secure and comfortable fit.

Further, each elongate structure of the bifurcated portion of bands described herein can include tubular structures, with outer tubes slidably engaging inner tubes and an elastic biasing member resisting relative motion between the tubes. In this way, the bands of the present disclosure are easily adjustable. The elastic biasing member, based on low-coefficient of friction values between the elastic biasing member and the inner and outer tubes, and also based on the single elastic biasing member disposed in both the upper and lower elongate portions of the bifurcated bands described herein, is able to shift and adjust automatically within the band to even out the tension force around the user's head for comfort. In this way, the force applied to the user's head is even, consistent, and comfortable.

The softer and larger (larger diameter) outer tubes of the bifurcated portion of bands described herein provide comfort to the user and mechanical support to external components, such as batteries, speakers, and the like, which may be secured to the band. At the same time, the inner, more rigid and harder tubes provide the necessary structure and durability of the band.

These and other embodiments are discussed below with reference to FIGS. 1-21. However, those skilled in the art will readily appreciate that the detailed description given herein with respect to these Figures is for explanatory purposes only and should not be construed as limiting. Furthermore, as used herein, a system, a method, an article, a component, a feature, or a sub-feature including at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

FIG. 1 illustrates a user 101 donning an example of a wearable electronic device 100 according to the present disclosure. In one example, the electronic device 100 includes a display unit 102 and a band 104 securing the display unit 102 to the user 101. The band 104 is connected to the display unit 102 and can wrap at least partially around the head of the user 101 such that the band 104 forces the display unit 102 against the face of the user 101. In one example, the band 104 forces or causes the display unit 102 to press against the forehead, cheeks, nose or other features of the user's head or face.

In one example, the wearable electronic device 100 is configured as a head mountable display (HMD) with the display unit 102 configured to output a visual display to the user's eyes when the user dons the wearable electronic device 100. As noted above, the configuration and positioning of the band 104, which secures the display portion of 102 to the head of the user 101, affects the stability of the display unit 102 resting or pressing against the face of the user 101. In order to sufficiently, consistently, and comfortably secure the display unit 102 of the wearable electronic device 100 to the head of the user 101, the band 104 can be configured according to a number of examples described herein.

One example of a band 204 according to the present disclosure is shown in FIG. 2A. FIG. 2A illustrates another example of a wearable electronic device 200 that includes a display portion 202 and a band 204 configured to secure the display portion 202 onto the head and against the face of a user. In the illustrative example of FIG. 2A, the band 204 includes a front portion 214 and a bifurcated rear portion 216. On either side of the band 204, bifurcation points 210, 212 are disposed between the front portion 214 and the rear portion 216 such that the bifurcation points 210, 212 define a boundary between the front portion 214 and the rear portion 216 of the band 204.

In at least one example, the rear portion 216 of the band 204 is bifurcated and includes an upper elongate structure 206 and a lower elongate structure 208. In at least one example, the upper elongate structure 206 diverges from the lower elongate structure 208 either or both of the bifurcation points 210, 212. In the illustrated example of FIG. 2A, the upper elongate structure 206 of the rear portion 216 extends rearward at an upward angle from the bifurcation points 210, 212 and the lower elongate structure 208 of the rear portion 216 extends rearward at a downward angle from the bifurcation points 210, 212. As such, upper and lower elongate structures 206, 208 are spaced apart from one another. And at least one example, the upper and lower elongate structures 206, 208 of the band 204 are configured to be disposed above and below the occipital protuberance, respectively, of the user's head when the user dons the electronic device 200.

The occipital protuberance of the skull forms a protrusion on the back of a user's head where bands of wearable electronic devices are typically disposed when worn by a user. The topography of the user's head at the protuberance creates sloped angles that tend to cause typical bands to slide one way or the other away from the protuberance when the band is putting pressure on the user's head to secure a device thereto. However, as noted above, examples of devices and bands described herein can be positioned on the user's head such that the occipital protrusion does not have such a negative effect on the securement of the device to the head. For example, as shown in FIG. 2A, the upper and lower elongate structures 206, 208 of the bifurcated rear portion 216 of the band 204 can be configured to extend above and below the occipital protuberance of the user, respectively, such that this feature of the head does not cause the band to slip up or down away from the protuberance. Rather, the upper and lower elongate structures 206, 208 can utilize the protuberance by engaging opposing slopes on either side of the protuberance for a more secure fit.

Figure 3:
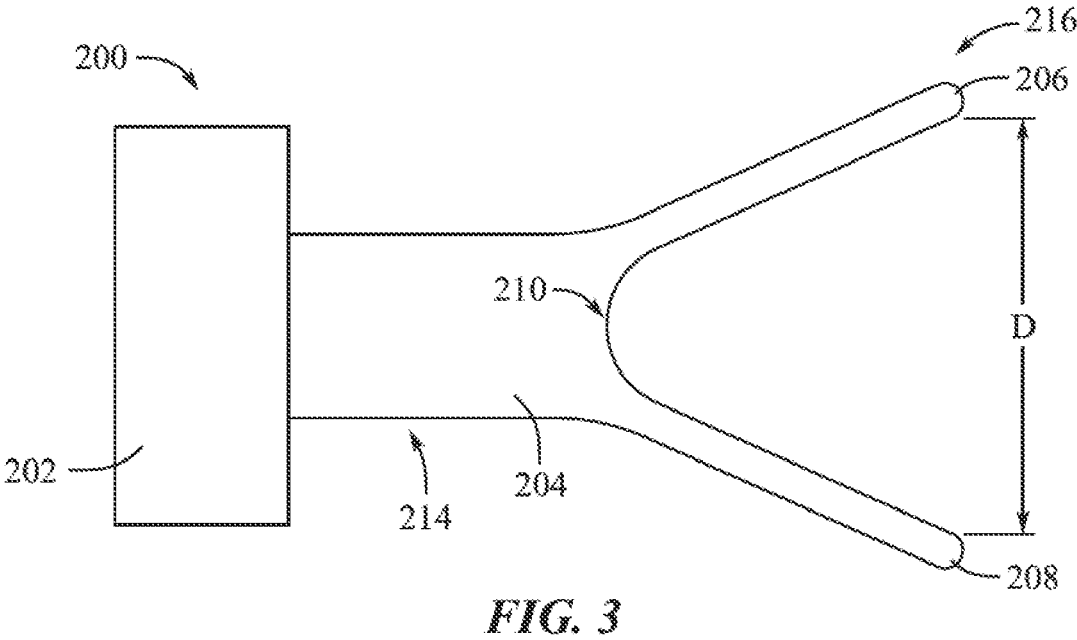
FIG. 3 shows a side view of the example electronic device of FIG. 2A.

Thus, the positions of the upper elongate structure 206 and what lower elongate structure 208 relative to the user's occipital protuberance can determine how effectively and comfortably the band 204 can secure the display portion 202 to the user's head. FIG. 3 shows a side view of the electronic device 200, including a display portion 202 and a band 204 configured to secure the display portion 202 to the head of the user. The upper elongate structure 206 extends at an upward angle from bifurcation point 210 and the lower elongate structure 208 extends at a downward angle from the bifurcation point 210. The angle at which each of the upper and lower elongate structures 206, 208 extend from the bifurcation point 210 can be the same, different, and vary from one example to another.

In addition, in at least one example, as shown in FIG. 2B, the electronic device 200 can also include a sheath 205 that at least partially surrounds the band 204 and/or spans between the upper and lower elongate structures 206, 208. For example, as shown in FIG. 2B, the band 204 can be encased or surrounded by an outer sheath 205. The sheath 205 can span an area between the upper and lower elongate structures 206, 208 such that the user's head is not exposed between the upper and lower elongate structures 206, 208. In some examples, the sheath 205 can completely encompass or surround the band 204 as shown in FIG. 2B. In one or more other examples, the sheath 205 can span only a part or multiple parts of the band 204 but not the entire band 204. In one example, the sheath 205 only encompasses or surrounds the rear portion 216 of the band 204 such that the upper and lower elongate structures 206, 208 are disposed within or at least partially within the sheath 205. In one example, the sheath 205 can provide additional material area pressing against the back of the user's head to distribute the force from the band 204 onto the user's head for comfort. In addition, one or more sections of the sheath 205 can be placed around one or more portions of the band 204 in order to hide certain portions for aesthetic purposes.

For purposes of illustration throughout the present disclosure, devices and bands described herein are generally shown without a sheath. However, the sheath 205 and any other examples of the sheath 205 described above can be included with any other device and band described herein with reference to other figures. Also, any of the devices and bands thereof shown and described herein may not include a sheath like the sheath 205 shown in FIG. 2B or any other sheath.

Figure 4:
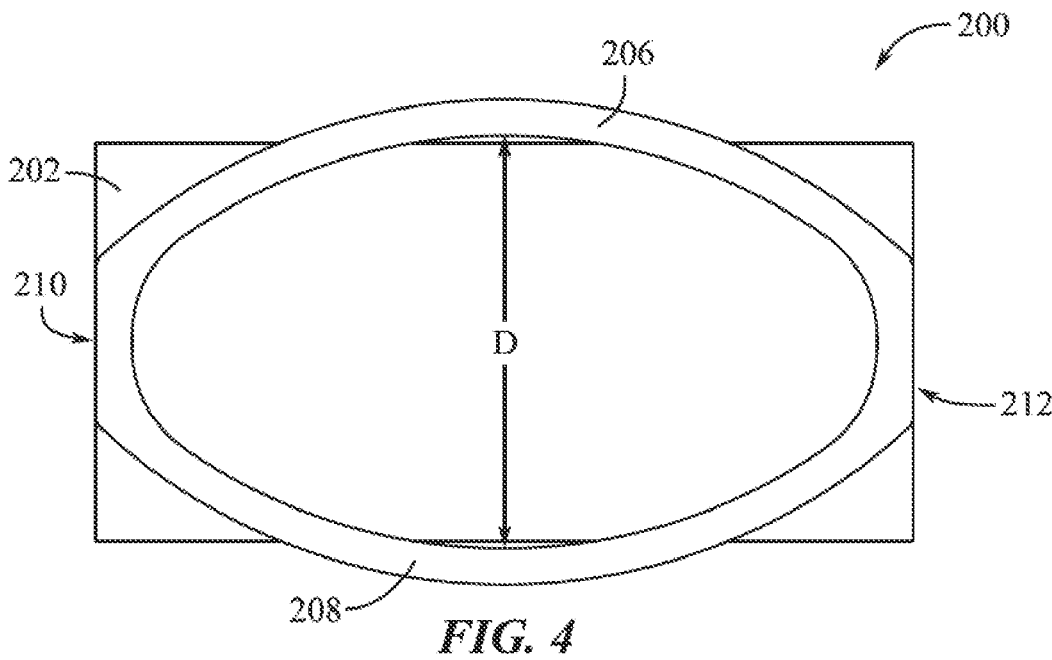
FIG. 4 shows a rear view of the example electronic device of FIG. 2A.

FIGS. 3 and 4 illustrate side and rear views of the electronic device 200 shown in FIG. 2A, respectively, showing that the upper elongate structure 206 and the lower elongate structure 208 of the bifurcated rear portion 216 of the band 204 extend non-parallel to one another between the bifurcation points 210, 212. In this way, a distance between the upper elongate structure 206 and lower elongate structure 208 can vary along a length of the upper and lower elongate structures 206, 208 extending between the bifurcation points 210, 212. In such an example, a maximum separation of the upper and lower elongate structures 206, 208 can occur in the middle of the rear portion 216, as shown in FIG. 4, to correspond in position above and below the occipital protuberance when donned by a user. The separation of the upper and lower elongate structures 206, 208 creates two separate force vectors from the band pressing the display portion 202 against the face of the user when the electronic device 200 is donned. The force vectors from each of the upper and lower elongate structures 206, 208 correspond to the position and angles of the upper and lower elongate structures 206, 208.

For example, the upper elongate structure 206 includes an upper position that creates an upward force vector acting on the display portion 202. This upward force vector acting on the display portion 202 urges or presses the display portion upward against the forehead or brow of the user above the eyes. At the same time, the lower elongate structure 208 includes a lower position that creates a downward force vector acting on the display portion 202. This downward force vector acting on the display portion 202 urges or presses the display portion downward against the nose and cheeks of the user's face. The combination of the upward and downward force vectors originating from the upper and lower bands 206, 208, respectively, form an effective securement in both directions such that the band 204 as shown in FIG. 2A resists the downward sliding of the display portion 202 via the upward force vector from the upper elongate structure 206 and resists the upward sliding of the display portion 202 via the downward force vector from the lower elongate structure 208.

In one example, in order to comfortably and securely position electronic device 200 on the head of the user as discussed above, a distance D at a maximum separation point between the upper elongate structure 206 in the lower elongate structure 208 can be at least about 70 mm, for example about 75 mm or about 80 mm. In one example, the distance D can be at least about 85 mm, 90 mm, 95 mm, or at least about 100 mm. These distances have been found to be effective for affording the advantages of the band 204 discussed herein.

The devices, features, components, configurations, and advantages thereof discussed with reference to the example shown in FIGS. 2A-4 can be included alone or in any combination with the devices, features, components, and configurations of other examples described with reference to other figures. Likewise, the devices, features, components, configurations, and advantages thereof discussed with reference to other examples in other figures can be included alone or in any combination with the devices, features, components, and configurations of the example shown in FIG. 2A-4.

Figure 5:
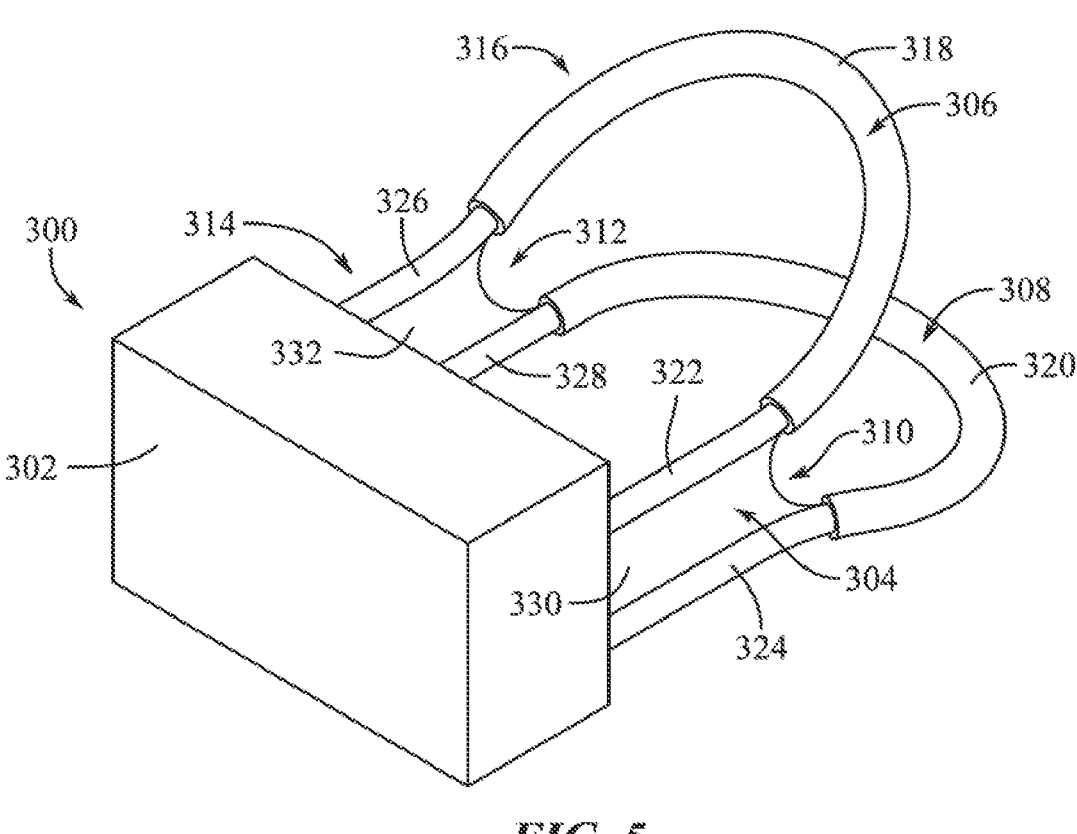
FIG. 5 shows a front perspective view of an example of an electronic device.

For example, the upper elongate structure 206 and the lower elongate structure 208 of the bifurcated rear portion 216 shown in FIGS. 2-4 can be configured as tubular structures, as shown in FIG. 5. As used herein, the term "tubular," "tube," or other similar terms can include hollow elongate members having any cross-sectional shape. The tubular structures shown in the examples described herein are shown as having circular cross-sectional shapes but are not limited as such. Rather, other examples can include tubes or tubular structures including hollow elongate members having square, triangular, rectangular, otherwise polygonal, or otherwise irregularly shaped cross-sectional geometries.

In addition, each "elongate member," "tube," "tubular structure," or other related feature or component of examples described herein, also includes a major/longitudinal central axis extending along a major length of the elongate structure referenced. These axes can be curved to follow the curvature of the associated structure or be straight when/if the structure is straight.

FIG. 5 illustrates a perspective view of another example of an electronic device 300 having a display portion 302 and a band 304 configured to be donned on the head of a user to secure the electronic device 300 thereto. In the example of FIG. 5, the band 304 includes a front portion 312 and a bifurcated rear portion 316. The bifurcated rear portion 316 can include a first elongate tubular structure 306 extending upward from and between two bifurcation points 310, 312 and a second, lower tubular structure 308 extending downward between the two bifurcation points 310, 312. The two bifurcation points 310, 312 can form a boundary between the bifurcated rear portion 316 and the front portion 314 of the band 304.

The orientation, angle, and configuration of the first and second elongate tubular structures 306, 308 can be similar to the orientation, angle, and configuration of the upper and lower elongate structures 206, 208, respectively, of FIGS. 2, 3, and 4. In addition, the first elongate tubular structure 306 of the electronic device 300 shown in FIG. 5 can include a first outer tube 318 extending between the bifurcation points 310, 312. Two upper inner tubes 322, 326 can extend from the front portion 314 of the band 304 and at least partially into the first outer tube 318 such that the first outer tube 318 surrounds at least a portion of the two upper inner tubes 322, 326.

Likewise, in at least one example, the second tubular structure 308 of the electronic device 300 shown in FIG. 5 can include a second outer tube 320 extending between the bifurcation points 310, 312. Two lower inner tubes 324, 328 can extend from the front portion 314 of the band 304 and at least partially into the second outer tube 320 such that the second outer tube 320 surrounds at least a portion of the two lower inner tubes 324, 328.

In addition, in at least one example, the upper inner tube 322 and the lower inner tube 324, both of which are shown extending from the display portion 302 to the bifurcation point 310 corresponding to a left side of the user's head when donned, can be fixed in position via a left material portion 330. Likewise, the upper inner tube 326 and lower inner tube 328 extending from the display portion to the bifurcation point 312 corresponding to the right side of the user's head can also be fixed in position via a right material portion 332.

The materials portions 330, 332 can couple the upper inner tubes 322, 326 together or otherwise in position relative to corresponding lower inner tubes 324, 328 between the display portion 302 and the rear bifurcated portion 316 of the band 304, thus defining the front portion 314 of the band 304. In another example, the inner tubes 322, 324, 326, 328 may not extend from the bifurcation points 310, 312 to the display portion 302 but rather may extend from the bifurcation points 310, 312 backward as part of the bifurcated rear portion 316 of the band.

In any case, the inner tubes 322, 324, 326, 328 can be at least partially surrounded by outer tubes 318, 320, as shown in FIG. 5, such that the inner tubes 322, 324, 326, 328 and corresponding outer tubes 318, 320 are slidably engaged. As shown in the side view of the electronic device 300 in FIG. 6, the first outer tube 318 of the first elongate tubular structure 306 can slidably engage the upper inner tube 322, which is at least partially disposed within the first outer tube 318 and shown in dotted lines inside the first outer tube 318 to indicate its position within the first outer tube 318, such that the first outer tube 318 can translate along a major axis back and forth as indicated by the arrows. In one example, the second outer tube 320 can also slidably engage the lower inner tube 324, which is also indicated in dotted lines inside the second outer tube 320 to indicate its position within the second outer tube 320, such that the second outer tube 320 of the second tubular structure 308 can slide axially back and forth as indicated by the arrows relative to the corresponding inner tubes 322, 324.

In this way, the length or size of the band 304 of the electronic device 300 can be adjustable. As the first and second outer tubes 318, 320 slide back and forth, a distance between a rear-most point of the first and second outer tubes 318, 320 (as indicated by the right-most point in the left side view of FIG. 6) can be moved further away or closer to the display portion 302. Thus, the total length of the band 304 can be adjusted and changed to accommodate different sizes of heads.

Figure 6:
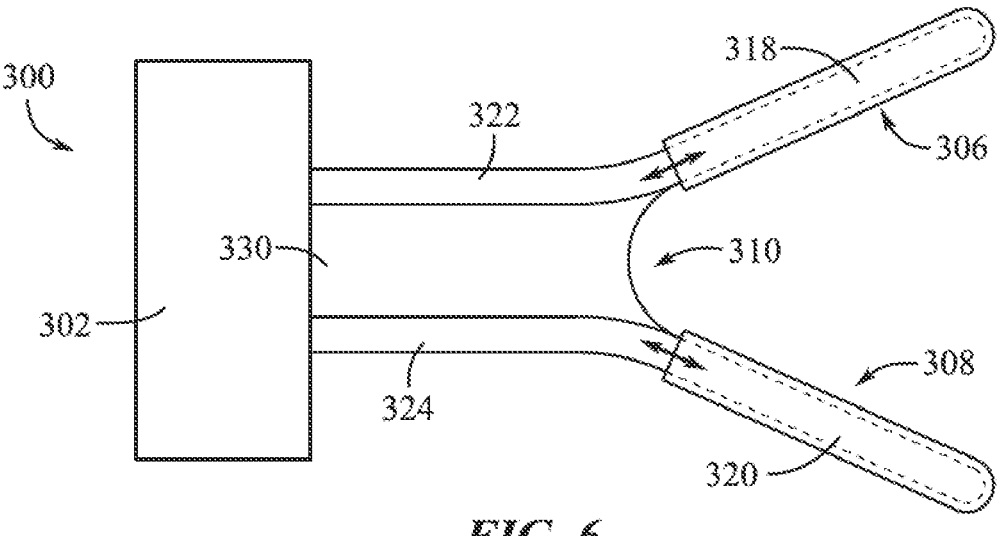
FIG. 6 shows a side view of the example electronic device of FIG. 5.
Figure 7:
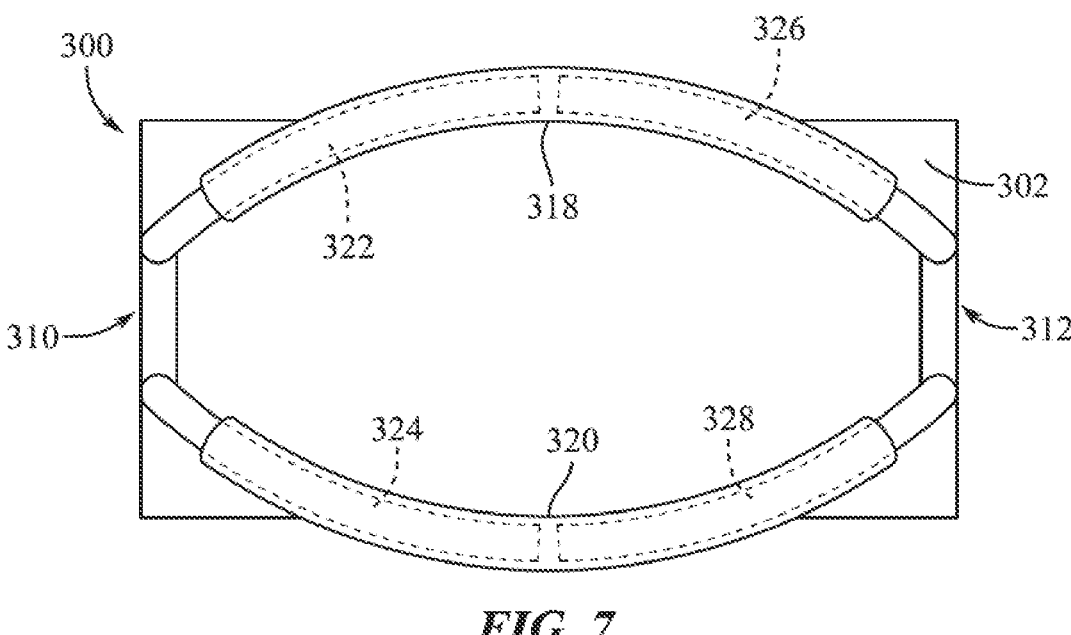
FIG. 7 shows a rear view of the example electronic device of FIG. 5.

FIG. 7 illustrates a rear view of the electronic device 300 shown in FIGS. 5 and 6. In this rear view, the inner tubes 322, 324, 326, and 328 are shown at least partially disposed within the corresponding first and second outer tubes 318, 320 as indicated by the dotted lines showing the portions of the inner tubes 322, 324, 326, 328 disposed within the first and second outer tubes 318, 320. In the illustrated example, neither of the upper inner tubes 322, 328 extend all the way through the first outer tube 318. Accordingly, the first outer tube 318 can be slid back away from the display portion 302 when adjusting the band 304. Likewise, neither of the lower inner tubes 324, 326 extend all the way through the second outer tube 320. Accordingly, the second outer tube 320 can be slid back away from the display portion 302 when adjusting the band 304.

The devices, features, components, configurations, and advantages thereof discussed with reference to the example shown in FIGS. 5-7 can be included alone or in any combination with the devices, features, components, and configurations of other examples described with reference to other figures. Likewise, the devices, features, components, configurations, and advantages thereof discussed with reference to other examples in other figures can be included alone or in any combination with the devices, features, components, and configurations of the example shown in FIGS. 5-7.

In order to prevent the outer tubes 318, 320 from disengaging completely from the inner tubes 322, 324, 326, 328, for example when the outer tubes 318, 320 are slid backward to lengthen the band 304 some examples of devices described herein, including electronic device 300, can include an additional member that biases the outer tubes 318, 320 together, thus resisting the outer tubes 318, 320 from axially sliding backward relative to inner tubes 322, 324, 326, 328 and display portion 302.

Figure 8:
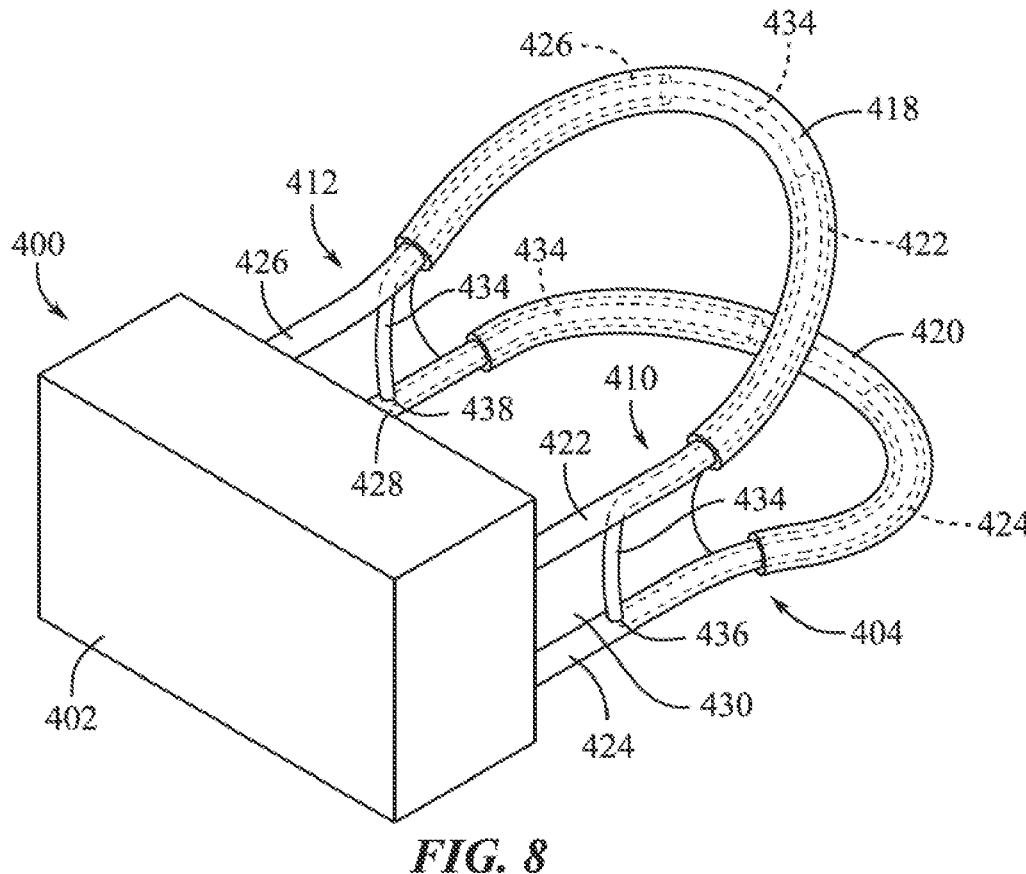
FIG. 8 shows a front perspective view of an example of an electronic device.

For example, the electronic device 400 shown in FIG. 8, which includes a band 404 configured to secure a display portion 402 on or around the head of a user, can include a biasing member 434 that biases the outer tubes 418, 420 to overlap and surround corresponding inner tubes 422, 424, 426, 428. That is, biasing member 434 can resist a first backward movement of the first outer tube 418 away from display portion 402 and a second backward movement of the second outer tube 420 away from the display portion 402. The biasing member 434, as well as other biasing members described herein with reference to other examples in other figures, can also be referred to as elastic members. As with other examples described herein with reference to other figures, the inner tubes 422, 424, 426, 428 can be fixed to the display portion or material portions disposed between corresponding inner tubes 422, 424, 426, 428 such that the outer tubes 418, 420 can move backward relative to the inner tubes 422, 424, 426, 428 while the inner tubes 422, 424, 426, 428 remain stationary. The example shown in FIG. 8 does not include material portions spanning or fixing the inner tubes 422, 424, 426, 428 as shown in other example, but the inner tubes 422, 424, 426, 428 and/or outer tubes 418, 420 still define bifurcation points 410, 412 where the inner tubes 422, 424, 426, 428 and/or outer tubes 418, 420 diverge at angles away from one another along the band 404 as shown.

In at least one example, the biasing member 434 can be formed of an elastic cord, tube, or other elastic elongate structure that passes from one inner tube 422, 424, 426, 428 to another via one or more apertures defined by the inner tubes 422, 424, 426, 428, for example apertures 436 and 438 defined by inner tube 424 and 428, respectively. Inner tubes 422 and 426 may also define apertures through which the biasing member 434 passes. In at least one example, the device 400 can also include material portion 430, which couples the inner tubes 422 and 424 together and the inner tubes 426 and 428 together. In this way, the inner tubes 422, 424, 426, 428 can be coupled as shown in FIG. 8 such that the inner tubes 422 and 424 together do not diverge before the bifurcation point 410 and the inner tubes 426 and 428 do not diverge before the bifurcation point 412.

In at least one example, as shown in FIG. 8, the biasing member is formed from one or more elastic materials or structures such that the biasing member 434 is elastic. In this way, when the user pulls back on the first outer tube 418 and/or the second outer tube 420 to lengthen the band 404 during donning and doffing, the biasing member will resist such a movement and urge or bias the outer tubes 418, 420 back toward the display portion 402. Once donned, the biasing member 434 creates an inward force around the head of the user, by biasing the outer tubes 418, 420 closer to the display portion and thus shortening the band 404, to ensure a secure fit during use.

In at least one example, as shown in FIG. 8, the electronic device 400 includes a single biasing member 434 disposed through both outer tubes 418, 420, as shown, and also through hat least a portion of each inner tube 422, 424, 426, 428, as shown. Certain materials can be used to form the biasing member 434, inner tubes 422, 424, 426, 428, and outer tubes 418, 420, as will be described in more detail below, to produce a low coefficient of friction between the inner tubes 422, 424, 426, 428 and the biasing member 434, between the inner tubes 422, 424, 426, 428 and the outer tubes 418, 420, and between the biasing member 424 and the outer tubes 418, 420, when the band 404 is stretched and each component moves relative to one another, while donning, doffing, and wearing.

In particular, the low coefficient of friction between the biasing member 434 and the inner and outer tubes 418-428, as well as the fact that only a single biasing member 434 is disposed throughout the various tubes 418-428, enable an even and consistent pressure/force to be distributed around the band 404 and applied to the user's head during use. Because the single biasing member 434 is free to shift and adjust within the tubes 418-428 based on the low coefficient of friction there between, and because of the singular structure of the biasing member 434, when the user pulls or stretches the band 404 by moving the outer tubes 418, 420 at one point along the band or another, once released or set onto the user's head, the biasing member 434 naturally distributes its own elastic return force evenly along the whole biasing member 434 or length thereof. That evenly distributed force from the elastic return of the biasing member 434 necessarily translates to an even force applied to the user's head from the tubes 418-428, since the force from the tubes 418-428 originates from the biasing member 434 urging the tubes 418-428 together, as discussed above.

Figure 9:
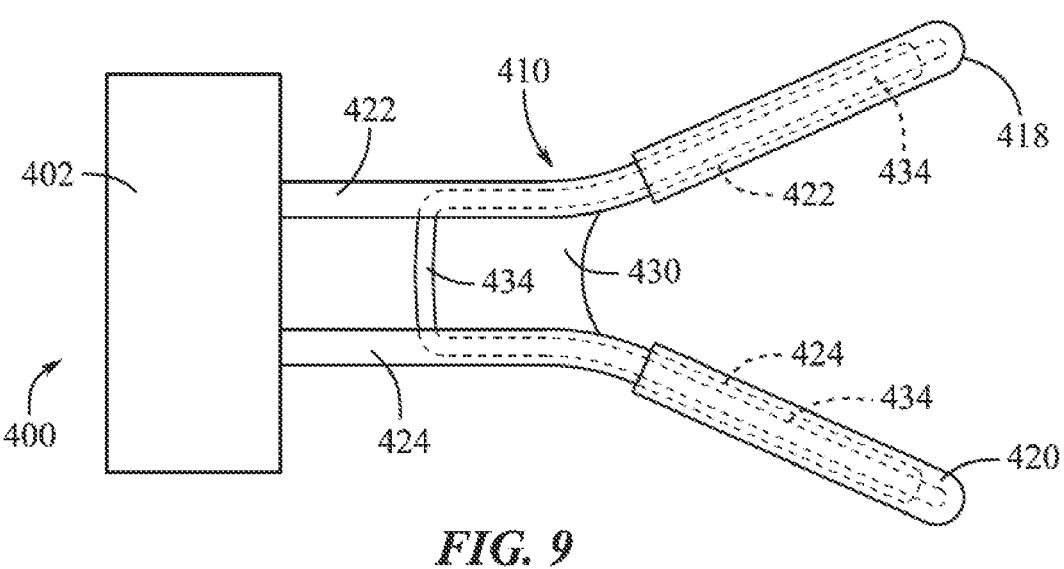
FIG. 9 shows a side view of the example electronic device of FIG. 8.

FIG. 9 illustrates a side view of the electronic device 400 shown in the perspective view of FIG. 8. The devices, features, components, configurations, and advantages thereof discussed with reference to the example shown in FIGS. 8-9 can be included alone or in any combination with the devices, features, components, and configurations of other examples described with reference to other figures. Likewise, the devices, features, components, configurations, and advantages thereof discussed with reference to other examples in other figures can be included alone or in any combination with the devices, features, components, and configurations of the example shown in FIGS. 8-9.

Figure 10:
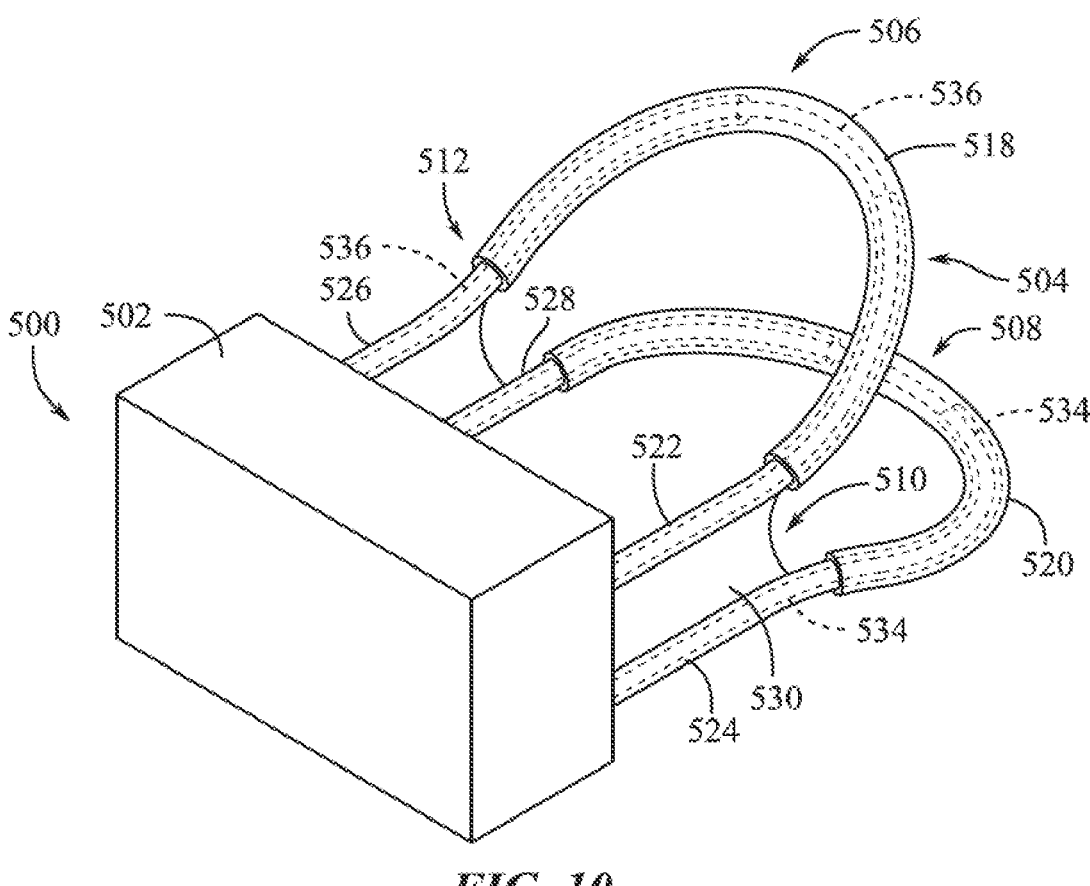
FIG. 10 shows a front perspective view of an example of an electronic device.
Figure 11:
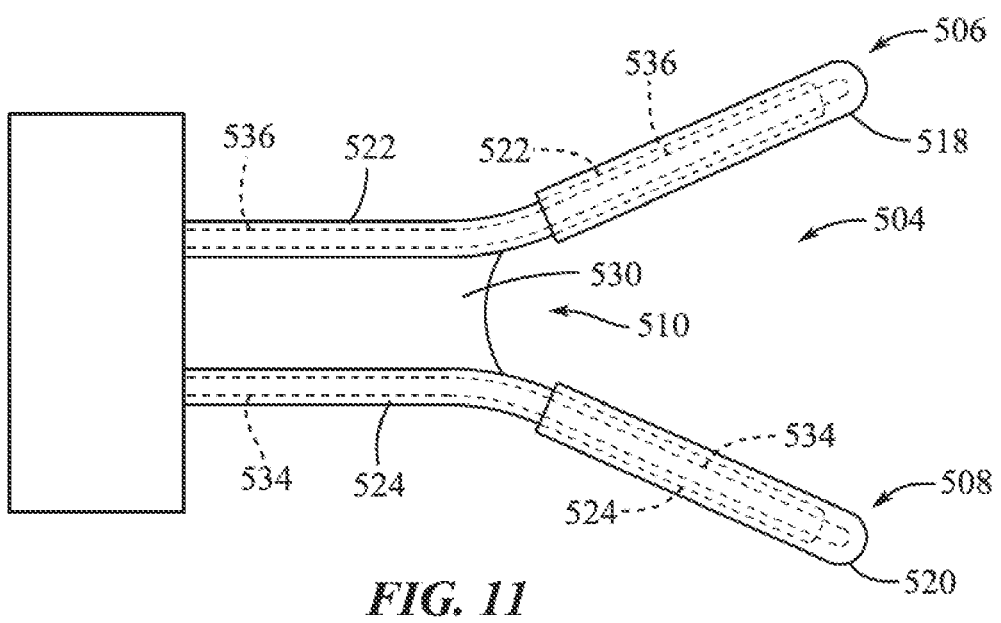
FIG. 11 shows a side view of the example electronic device of FIG. 10.

FIGS. 10 and 11 show perspective and side views, respectively, of another example of an electronic device 500. The electronic device 500 also includes a display portion 502 and a band 504 configured to secure the electronic device 500 to the head or other body part of a user. In the illustrated example, two separate biasing members, for example first elastic cord 536 and second elastic cord 534, are disposed within upper inner tubes 522, 526 and first outer tube 518 and within lower inner tubes 524, 528 and second outer tube 520, respectively. In such an example, the upper elongate structure 506 of the band is separate from the lower elongate portion 508 of the band in that no single biasing member is disposed through both.

In at least one example, the device 500 can also include material portion 530, which couples the inner tubes 522 and 524 together and the inner tubes 526 and 528 together. In this way, the inner tubes 522, 524, 526, 528 can be coupled as shown in FIG. 8 such that the inner tubes 522 and 524 together do not diverge before the bifurcation point 510 and the inner tubes 526 and 528 do not diverge before the bifurcation point 512.

In the illustrated example of FIGS. 10 and 11, each elastic cord 534, 536 can be separately anchored to the display portion 502 such that each elastic cord 534, 536 resists the pulling or backward movement of first and second outer tubes 518, 520 relative to the inner tubes 522, 524, 526, 528 about which the outer tubes 518, 520 are disposed. When donned by the user, the elastic cords 534, 546 produce a pressing force against the user's head to secure the electronic device 500 thereto.

The devices, features, components, configurations, and advantages thereof discussed with reference to the example shown in FIGS. 10-11 can be included alone or in any combination with the devices, features, components, and configurations of other examples described with reference to other figures. Likewise, the devices, features, components, configurations, and advantages thereof discussed with reference to other examples in other figures can be included alone or in any combination with the devices, features, components, and configurations of the example shown in FIGS. 10-11.

Figure 12:
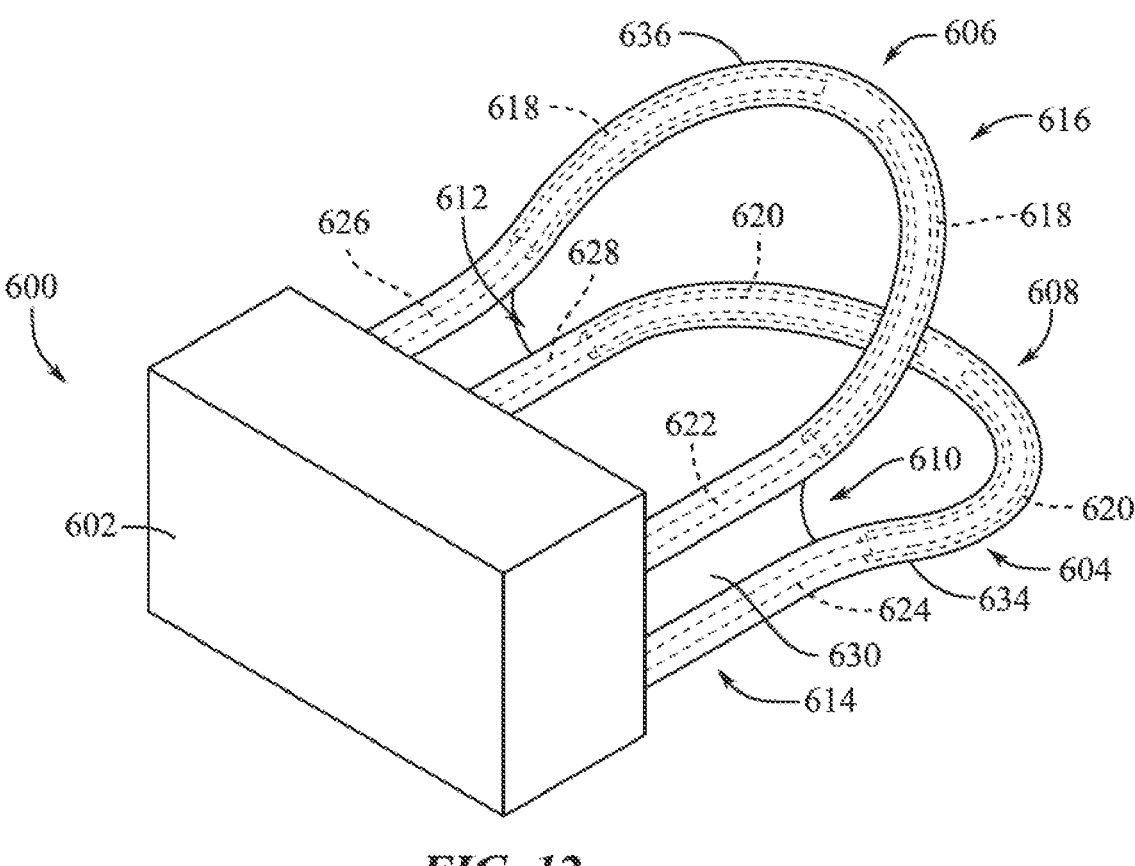
FIG. 12 shows a front perspective view of an example of an electronic device.
Figure 13:
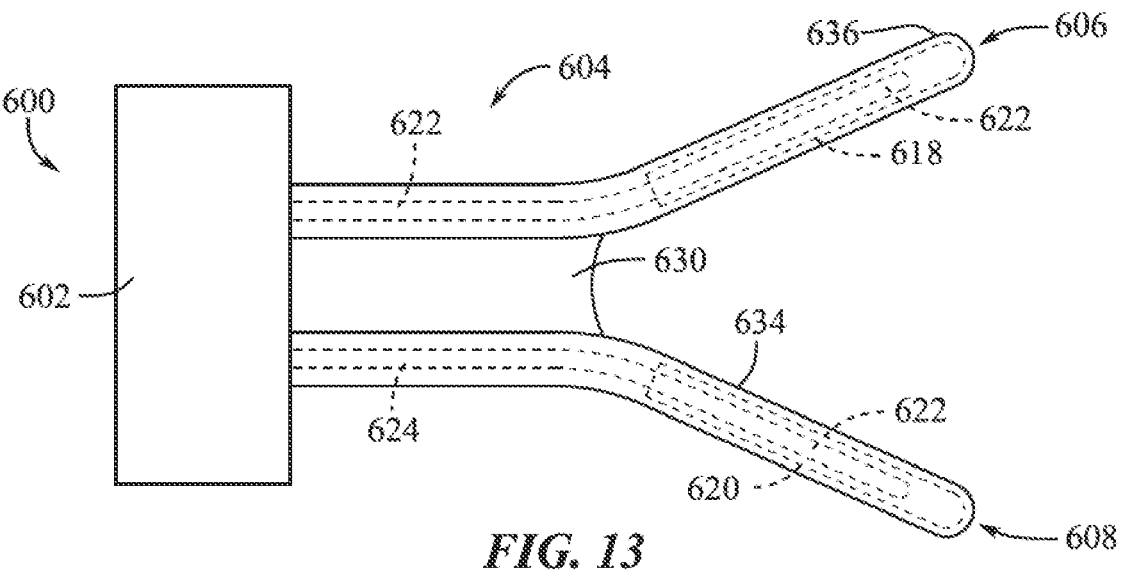
FIG. 13 shows a side view of the example electronic device of FIG. 12.

FIGS. 12 and 13 show perspective and side views, respectively, of another example of an electronic device 600. The electronic device 600 includes a display portion 602 and a band 604 configured to secure the display portion 602 to the head of a user. In the illustrated example of FIGS. 12 and 13, a front portion 614 of the band 604 is separated from a bifurcated rear portion 616 of the band 604 at bifurcation points 610, 612, similar to other examples of devices described herein. The bifurcated rear portion 616 includes an upper elongate structure 606 and a lower elongate structure 608. The upper elongate structure 606 can include a first outer tube 618 and at least a portion of upper inner elongate members 622, 626 disposed within the first outer tube 618. The lower elongate structure 608 can include a second outer tube 620 and at least a portion of lower inner elongate members 624, 628 disposed within the second outer tube 620.

In at least one example, the device 600 can also include material portion 630, which couples the inner tubes 622 and 624 together and the inner tubes 626 and 628 together. In this way, the inner tubes 622, 624, 626, 628 can be coupled as shown in FIG. 8 such that the inner tubes 622 and 624 together do not diverge before the bifurcation point 610 and the inner tubes 626 and 628 do not diverge before the bifurcation point 612.

In at least one example, as shown in FIGS. 11 and 12, the first and second biasing members 634, 636 are disposed outside of respective outer tubes 618, 620 and elongate members 622, 624, 626, 628. For example, the first biasing member 536 can be disposed outside and around/surrounding the first outer tube 618 and associated upper elongate members 622, 626. Also, the second biasing member 534 can be disposed outside and around/surrounding the second outer tube 620 and associate lower elongate members 624, 628. Accordingly, the outer tubes 618, 620 and elongate members 622, 624, 626, 628 are shown in dotted lines in FIGS. 12 and 13 to indicate a disposition within or inside the first and second biasing members 634, 636. Biasing members 634, 636 according to the example of FIGS. 12 and 13 can thus also be referred to as sheathes, sleeves, elastic sheathes, or elastic sleeves, as well as cords and elongate members similar to other biasing members described herein.

In at least one example, the first and second biasing members 634, 636 can be formed of one or more elastic materials, as noted elsewhere with reference to other examples of biasing members, for example polymers such as rubber or other elastic materials. In at least one example, the first and/or second biasing members 634, 636 of FIGS. 12 and 13 can include an elastic fabric or textile, such as a knitted or woven fabric or textile. In at least one example, each of the biasing members 634, 636 can be anchored at the ends thereof, for example at the display portion 602 of the electronic device 600, such that the biasing members 634, 636 resist the backward movement of the associated outer tubes 618, 620 and provide a securing force around the user's head when the user dons the electronic device 600.

In addition, the inner elongate members 622, 624, 626, 628 of the example shown in FIGS. 12 and 13 can include solid elongate members (rather than hollow tubular members/structures as shown in other examples) such as solid cords, wires, bands, or other solid elongate structures.

The devices, features, components, configurations, and advantages thereof discussed with reference to the example shown in FIGS. 12-13 can be included alone or in any combination with the devices, features, components, and configurations of other examples described with reference to other figures. Likewise, the devices, features, components, configurations, and advantages thereof discussed with reference to other examples in other figures can be included alone or in any combination with the devices, features, components, and configurations of the example shown in FIGS. 12-13.

Figure 14:
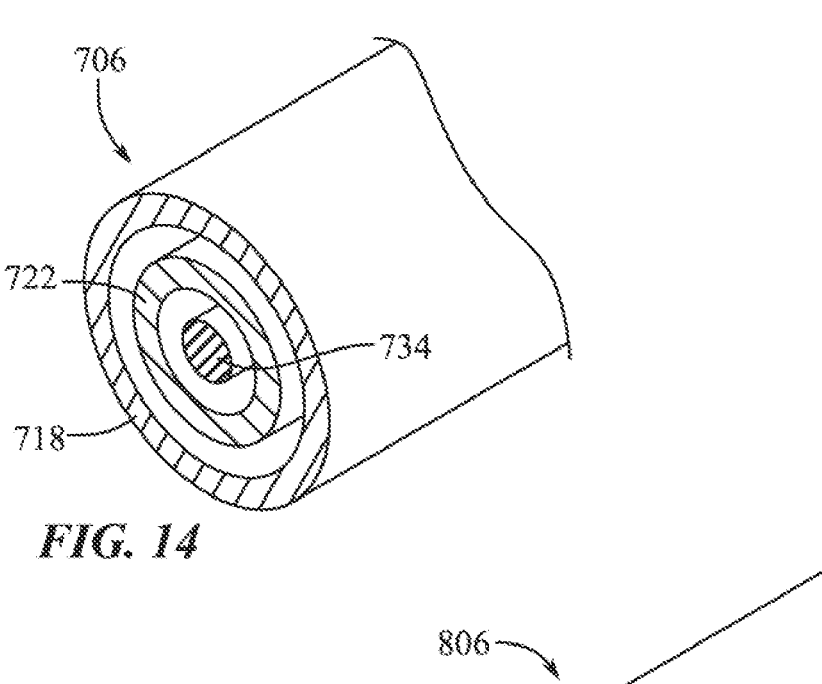
FIG. 14 shows a partial and cross-sectional view of an example of an elongate structure of an electronic device.
Figure 15:
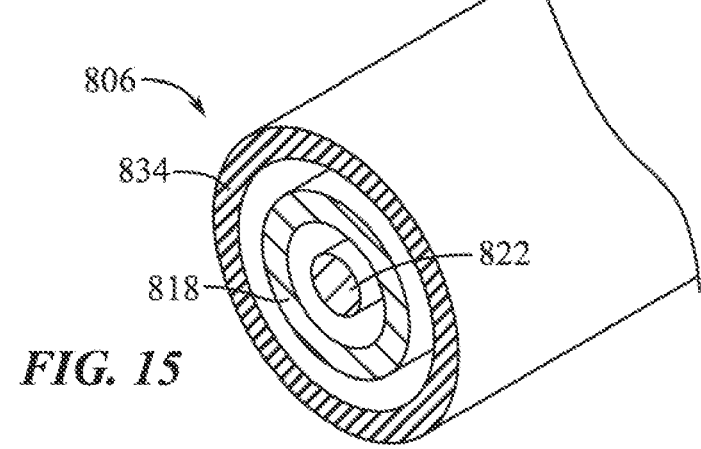
FIG. 15 shows a partial and cross-sectional view of an example of an elongate structure of an electronic device.

FIGS. 14 and 15 illustrate partial, cross-sectional views of elongate structures described herein. In the example of FIG. 14, the elongate structure 706 can include an outer tube 718, an inner tube 722 disposed within the outer tube 718, and a biasing member 734 disposed within the inner tube 722. The elongate structure 706 shown in FIG. 14 can be similar to those elongate structures and tubular structures described with reference to examples shown in FIGS. 2-13. In at least one example, the inner tube 722 of the elongate structure 706 can be formed of a material having a low coefficient of friction with the surrounding structures, including the outer tube 718 and the biasing member 734, both of which may tend to rub or contact the inner tube 722 during use. In order to reduce friction within the elongate structure 706, in one example, the inner tube 722 can be formed of Teflon. In another example, the inner tube is formed of one or more of low-friction polymers or materials. In at least one example, the elongate structure 706 can include one or more lubricants or low friction coating and medium disposed on or between the inner tube 722 and surrounding structures, such as elastic cord 734 and outer tube 718.

In at least one example, the inner tube 722 can be more rigid and/or harder than the outer tube 718. The less rigid and/or softer outer tube 722 can offer comfort to the user as the outer tube 722 is in contact with the back and sides of the user's head during use and the securement forces generated by the elastic cord 734 are transferred to the user's head through the outer tube 718. In this way, the inner tube 722 can provide rigidity and strength to the structure of the band, of which the elongate structure 706 is a part, and the outer tube 718 can provide comfort to the user.

In addition, the outer tube 718, which includes a larger diameter than the inner tube 722, can structurally support external components of devices secured to the elongate structure 706 due to the larger diameter of the outer tube 718. For example, one or more components associated with the electronic devices described herein, such as HMD devices, can be secured to the band at the outer tube 718 during use. Such components can include, for example, batteries, antenna modules, speakers, or other components and accessories of the devices described herein. Because of the larger diameter of the outer tube 718, the outer tube can structurally support the external components that may be secured thereto while preventing or reducing the instances of the bands described herein slipping or falling down and out of position on the user's head.

In at least one example, as shown in FIG. 14, the inner and outer diameters of the various components of the elongate structure 706 can be such that each component is separated by an internal gap or spacing. In this way, the friction between components remains low and the bands of the electronic devices described herein can bend and flex as needed without being limited by the interactions between the inner tube 722 and the elastic cord 734 and the outer tube 718.

Accordingly, in the examples of bands of the electronic devices described herein, the configurations, materials, coefficients of friction, optional lubricants, spacing, and geometries of the biasing members, inner tubes/elongate members, and outer tubes are such that the biasing members are able to apply an evenly distributed force around the user's head. In one example, the evenly distributed force does not deviate greater than 1 Newton (N) at any point along or around at least the bifurcated rear portion of the bands relative to any other point there along. In at least one example, the force applied to the user's head by the bands described herein can be about 15N (with about 7.5N applied by each of the left and right sides of the band) ±1N. The magnitude of the force can vary in other examples while the delta-variation in force along the band remains within 1N. For example, the tension or force applied by the upper elongate structure of the bifurcated rear portions of the bands described herein can be with 1N of the tension or force applied by the lower elongate structure of the bifurcated rear portions of the bands described herein.

The devices, features, components, configurations, and advantages thereof discussed with reference to the example shown in FIG. 14 can be included alone or in any combination with the devices, features, components, and configurations of other examples described with reference to other figures. Likewise, the devices, features, components, configurations, and advantages thereof discussed with reference to other examples in other figures can be included alone or in any combination with the devices, features, components, and configurations of the example shown in FIG. 14.

Along these lines, FIG. 15 illustrates another example of an elongate structure 806, which can be included in the bands described herein, which includes an inner elongate member 822 disposed within an outer tube 818 and an outer biasing member 834 disposed around/surrounding the outer tube 818. The biasing member 834 shown in FIG. 15 can be similar to those described with reference to the example of FIGS. 12 and 13. The materials, configurations, low coefficient of friction, lubricants, and other features and advantages of the elongate structure 706 described with reference to the example of FIG. 14 are also applicable to the elongate structure 806 described with reference to the example of FIG. 15.

Figure 16:
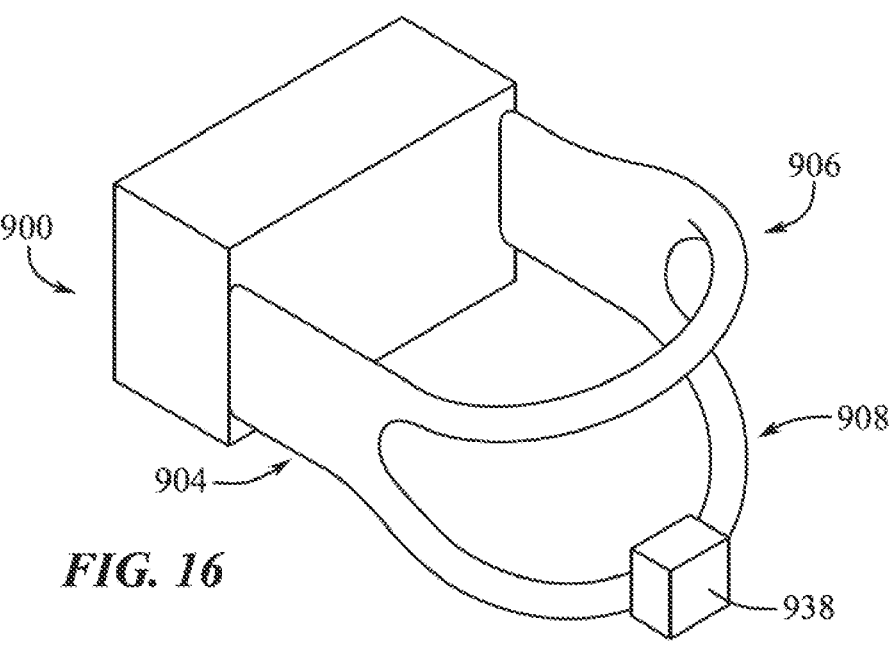
FIG. 16 shows a rear-perspective view of an example of an electronic device.

FIG. 16 illustrates an example of an electronic device 900 having a band 904. The band can include an upper elongate structure 906 and a lower elongate structure 908. In addition, the band can include a tensioner mechanism 938 coupled with the band 904. The tensioner mechanism 938 can be coupled with the biasing member of the band 904 (not shown) such that manipulation or use of the tensioner mechanism can adjust the tension or applied force of the band 904 to the user's head by adjusting the length or otherwise adjusting the tension force of the biasing member.

Figure 17:
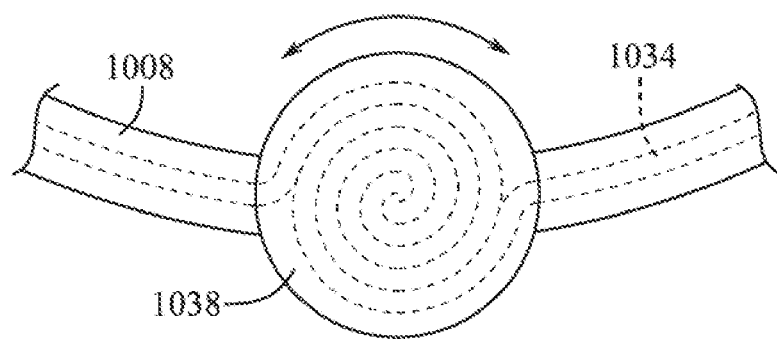
FIG. 17 shows a partial view of an electronic device and an example of a tensioner mechanism thereof.

In at least one example, as shown in FIG. 17, the tensioning mechanism can include a dial tensioner 1038 coupled to the biasing member 1034 (or "elastic member") disposed within the elongate structure 1008 of a band. Rotating the dial tensioner 1038 clockwise or counterclockwise can increase and decrease the length of the biasing member 1034 such that the tension force applied to the head of the user by the biasing member is adjusted accordingly.

Figure 18:
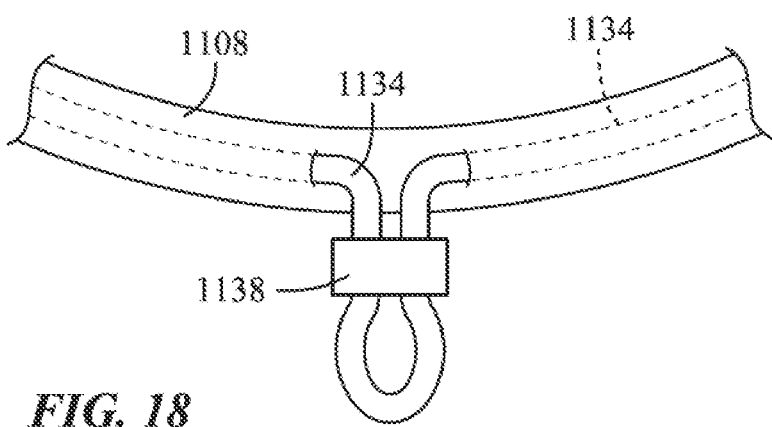
FIG. 18 shows a partial view of an electronic device and an example of a tensioner mechanism thereof.

Other tensioner mechanisms can also be included in one or more other examples, for example as shown in FIG. 18. The tensioner mechanism 1138 shown in FIG. 18 includes a selective locking adjustment mechanism through which the biasing member can be pulled and locked in position to different extents. This, in effect, can change the length of the biasing member 1134 within the elongate structure 1108 and therefore within the band of which the elongate structure 1108 is a part, to correspondingly change the tension/force applied to the head of the user by the biasing member 1134.

The devices, features, components, configurations, and advantages thereof discussed with reference to the example shown in FIGS. 16-18 can be included alone or in any combination with the devices, features, components, and configurations of other examples described with reference to other figures. Likewise, the devices, features, components, configurations, and advantages thereof discussed with reference to other examples in other figures can be included alone or in any combination with the devices, features, components, and configurations of the example shown in FIGS. 16-18.

Figure 19:
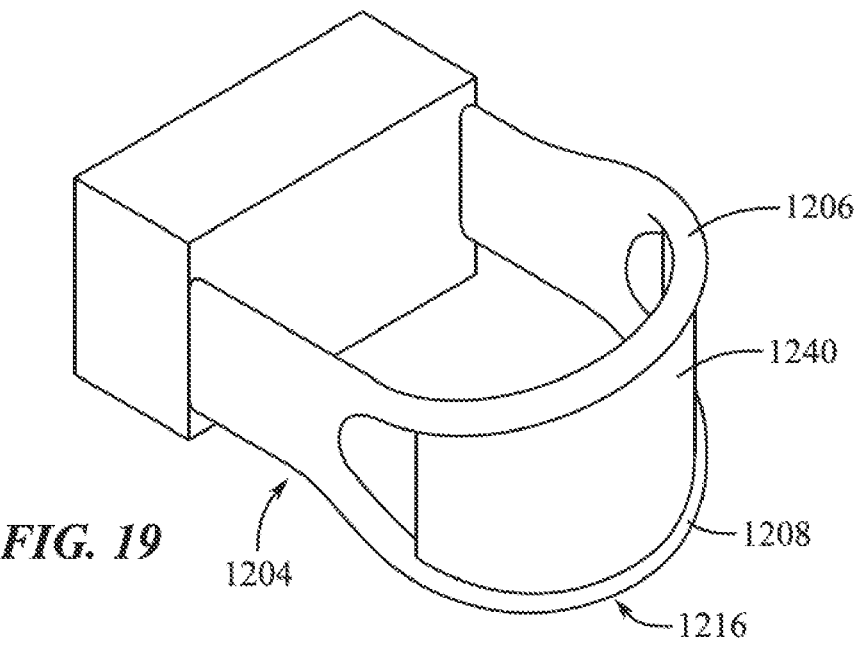
FIG. 19 shows a rear perspective view of an example of an electronic device.

As noted above, some examples of devices described herein can include external components and accessories that can be secured to the band of the device, for example at one or more of the elongate structures of the bifurcated rear portion of the band. In some examples, components disposed externally to the band of the electronic device can be secured to both elongate structures of the bifurcated rear portion of the band. For example, as shown in FIG. 19, an external component 1240 can be secured to the upper and lower elongate structures 1206 of the rear bifurcated portion of the band 1204. The external component 1240 can be clipped, adhered, or otherwise permanently or removably fixed to the upper and lower elongate structures 1206, 1208 via one or more respective outer tubes or elongate structures, as noted above with reference to other examples in other figures. Also, as noted above, the dual tubular structure of the upper and lower elongate structures 1206, 1208, as described in more detail with reference to examples shown in other figures, provides an outer tube with a greater diameter than the structurally harder inner tube to structurally handle the weight of the external component 1240 secured to the band 1204 as shown without slipping down the head of the user when donned.

Figure 20:
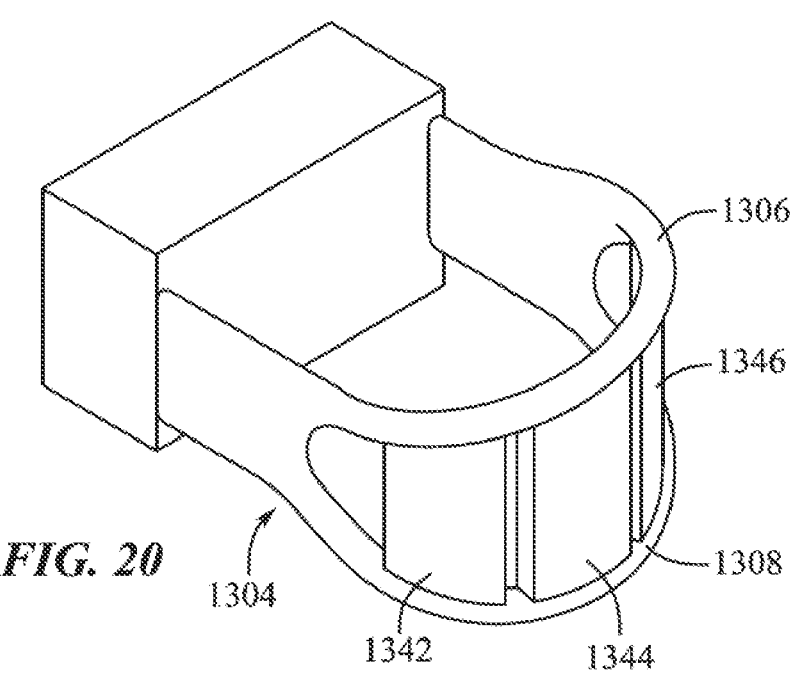
FIG. 20 shows a rear perspective view of an example of an electronic device.

In another example, as shown in FIG. 20, multiple external components 1342, 1344, 1346 can be secured to the upper and/or lower elongate structures 1306, 1308 as shown, with each external component secured at a different position along the band 1304. In the illustrated examples, the external components 1240, 1342-1346 are shown as being secured to both upper and lower elongate structures 1206, 1208, 1306, 1308 of the bands 1204, 1304, but other examples can include external structures that are only secured to a single elongate structure, either the upper or the lower.

The devices, features, components, configurations, and advantages thereof discussed with reference to the example shown in FIGS. 19-20 can be included alone or in any combination with the devices, features, components, and configurations of other examples described with reference to other figures. Likewise, the devices, features, components, configurations, and advantages thereof discussed with reference to other examples in other figures can be included alone or in any combination with the devices, features, components, and configurations of the example shown in FIGS. 19-20.

In examples where one or more external components are each secured to one or more elongate structures of a bifurcated rear portion of a band, the one or more external components can be secured to the band via one or more dynamic brackets that can expand and contract with the flexible nature of the band and elongate structures to which they are secured. In this way, rigid external components can be secured to the band, including the elongate structures of the bifurcated rear portions of the band, without negatively impacting the flexibility of the band.

Figure 21:
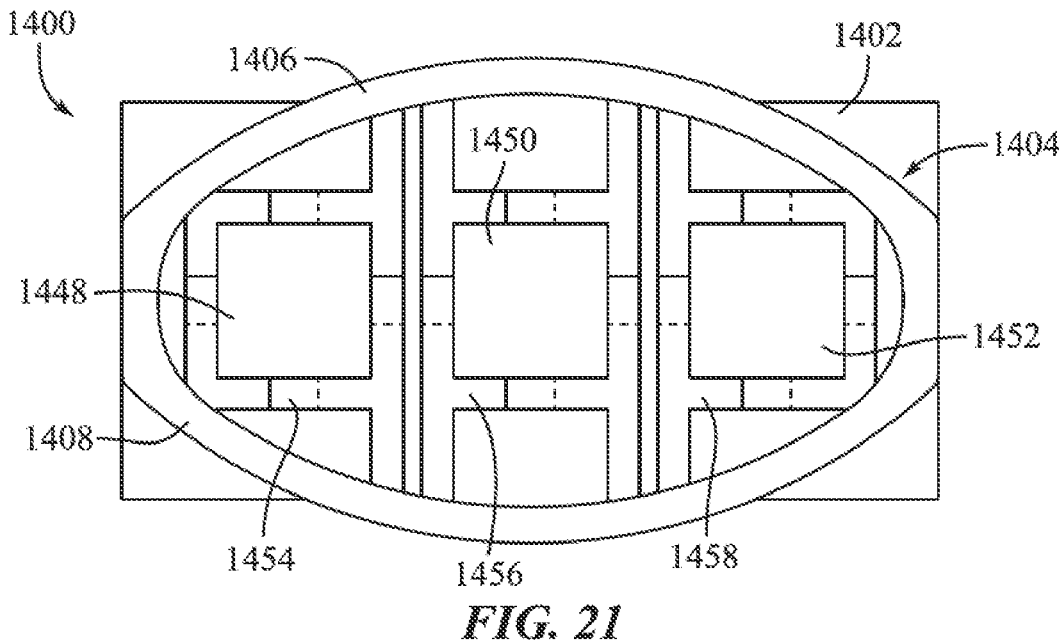
FIG. 21 shows a rear view of an example of an electronic device.

For example, as shown in FIG. 21, each external component 1448, 1450, 1452, which can include one or more external electronic components such as battery components, antenna components, speaker components, and the like, can each be secured to the upper and lower elongate structures 1406, 1408 of the band 1404 via respective brackets 1454, 1456, 1458. Each bracket 1454, 1456, 1458 can include one or more slidably or adjustably connected portions that overlap one another or otherwise slidably or adjustably engage, as indicated by the dotted lines and other features shown in FIG. 21, to form a single dynamic bracket. The various slidably or adjustably engaged portions of each bracket 1454, 1456, 1458 can move relative to one another to adjust the size of the brackets 1454, 1456, 1458 vertically and horizontally.

As such, each bracket 1454, 1456, 1458 can adjust to form to the flexible and movable upper and lower elongate structures 1406, 1408 of the band 1404 as the band is flexed and moved during donning and doffing. In particular, each bracket 1454, 1456, 1458 can be secured to an outer tube or tubular structure of the upper and lower elongate structures 1406, 1408 such that the rigid external components 1448, 1450, 1452 can be secured thereto while still allowing the outer tubes of the upper and lower elongate structures 1406, 1408 to flex and bend as needed.

The present systems and methods can, in some instances, gather and use data available from various sources that can be used to improve the delivered content. If personal information data is collected, it should be collected using appropriate and well recognized protocols.

Specific details detailed above are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A head-mountable display, comprising:
a display unit; and
a band, wherein:
the band is connected to the display unit; and
the band is configured to hold the display to a user's head, the band comprising:
a tubular structure including an outer tube, and an inner tube disposed within the outer tube;
a cord disposed within the inner tube;
a first bifurcation point; and
a second bifurcation point;
wherein the outer tube defines:
a first tubular structure extending upward between the first bifurcation point and the second bifurcation point; and
a second tubular structure extending downward between the first bifurcation point and the second bifurcation point.

2. The head-mountable display of claim 1, the inner tube is a first inner tube disposed within the first tubular structure, the second tubular structure comprising a second inner tube disposed within the second outer tube.

3. The head-mountable display of claim 2, wherein the cord is disposed within the second inner tube.

4. The head-mountable display of claim 2, wherein the first tubular structure diverges from the second tubular structure at a first bifurcation point and a second bifurcation point such that the first tubular structure and the second tubular structure are non-parallel.

5. The head-mountable display of claim 4, wherein a distance between the first tubular structure and the second tubular structure is at least 70 mm at a maximum separation point.

6. The head-mountable display of claim 2, wherein the cord resists a movement of the second inner tube relative to the second tubular structure along a longitudinal axis of the second tubular structure.

7. A band for a wearable electronic device, the band configured to hold a display to a user's head and having a bifurcated portion, the bifurcated portion comprising:
a first bifurcation point;
a second bifurcation point positioned opposite the first bifurcation point;

an upper structure positioned above and between the first bifurcation point and the second bifurcation point having a first outer elongate member, and a first inner elongate member disposed within the first outer elongate member;

a lower structure positioned below and between the first bifurcation point and the second bifurcation point having a second outer elongate member, and a second inner elongate member disposed within the second outer elongate member; and a biasing member disposed within the upper structure and the lower structure.

8. The band of claim 7, wherein the biasing member opposes an axial movement of the first outer elongate member relative to the first inner elongate member.

9. The band of claim 8, wherein:

the first inner elongate member comprises a hollow tubular structure;

the second inner elongate member comprises a hollow tubular structure; and the biasing member is disposed within the first inner elongate member and the second inner elongate member.

10. The band of claim 9, wherein the biasing member comprises an elastic cord.

11. The band of claim 8, wherein at least a portion of the biasing member is disposed outside the first outer elongate member.

12. The band of claim 11, the biasing member comprising an elastic sheath, the first outer elongate member disposed within the elastic sheath.

13. A band, comprising:

a first bifurcation point;

a second bifurcation point;

a tubular structure extending from the first bifurcation point to the second bifurcation point, the tubular structure comprising an outer tube, and an inner tube disposed within the outer tube; and an elastic member disposed within the tubular structure.

14. The band of claim 13, further comprising an elongate structure extending from the first bifurcation point to the second bifurcation point, the elongate structure disposed non-parallel to the tubular structure, wherein the elastic member is disposed within the elongate structure.

15. The band of claim 13, wherein:

the tubular structure comprises:

an outer tube; and an inner tube disposed within the outer tube;

wherein the elastic member is disposed within the inner tube.

16. The band of claim 15, wherein a material of the inner tube is harder than a material of the outer tube.

17. The band of claim 13, further comprising a tensioner coupled to the elastic member.

18. The band of claim 13, further comprising an external electronic component coupled to the tubular structure.

\* \* \* \* \*